(12) United States Patent
Dickinson et al.

(10) Patent No.: US 11,994,055 B2
(45) Date of Patent: May 28, 2024

(54) FLOW ESTIMATION FOR SECONDARY AIR SYSTEM

(71) Applicant: Garrett Transportation I Inc., Torrance, CA (US)

(72) Inventors: Paul Dickinson, Bristol (GB); Ondrej Santin, Pleší (CZ); Malay C. Maniar, Boeblingen (DE)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 18/322,411

(22) Filed: May 23, 2023

(65) Prior Publication Data

US 2024/0026809 A1     Jan. 25, 2024

Related U.S. Application Data

(63) Continuation of application No. 17/869,633, filed on Jul. 20, 2022, now Pat. No. 11,698,014.

(51) Int. Cl.
   *F01N 3/22*     (2006.01)
   *F02B 37/18*    (2006.01)
   (Continued)

(52) U.S. Cl.
   CPC ............ *F01N 3/225* (2013.01); *F02B 37/183* (2013.01); *F02D 41/0007* (2013.01); *F02D 41/029* (2013.01); *F02D 41/1406* (2013.01); *F02D 41/1448* (2013.01); *F01N 3/30* (2013.01); *F01N 2550/14* (2013.01); *F02D 2041/1433* (2013.01);
   (Continued)

(58) Field of Classification Search
   CPC .................. F01N 3/05; F01N 3/22–225; F01N 3/30–306; F01N 2270/00–10; F01N 2550/14; F01N 2900/1804; F02B 37/183; F02D 41/0007; F02D 41/029; F02D 41/1406; F02D 41/1448; F02D 2041/1433; F02D 2200/0406; F02D 2200/0414;
   (Continued)

(56) References Cited

U.S. PATENT DOCUMENTS 6,370,871 B2   4/2002   Suzuki et al.
6,637,204 B2   10/2003  Ellmer et al.
(Continued)

FOREIGN PATENT DOCUMENTS

EP    3020940 A1      5/2016
WO    2002052130 A1   7/2002

OTHER PUBLICATIONS

Jung, H. et al., "Model Based Burnt Gas Fraction Controller Design of Diesel Engine with VGT/Dual Loop EGR System," International Journal of Automotive Technology, vol. 17, No. 4, pp. 555-566 (2016), 12 pages.
Extended European Search Report for EP Patent Application No. 23177202.1 dated Dec. 4, 2023, 13 pages.

*Primary Examiner* — Hung Q Nguyen
*Assistant Examiner* — Mark L. Greene
(74) *Attorney, Agent, or Firm* — Seager, Tufte & Wickhem, LLP

(57) ABSTRACT

Methods and systems using model based and iterative calculations of mass flow throughout an internal combustion engine system. A secondary air injection valve is provided to selectively allow intake air to pass to the exhaust side of the engine system to aid in exothermic reaction with exhaust gasses exiting the engine for various purposes. The iterative calculations of mass flow include estimation of the mass flow through the secondary air injection valve.

20 Claims, 4 Drawing Sheets

(51) Int. Cl.
*F02D 41/00* (2006.01)
*F02D 41/02* (2006.01)
*F02D 41/14* (2006.01)
*F01N 3/30* (2006.01)

(52) U.S. Cl.
CPC ........ *F02D 2200/0406* (2013.01); *F02D 2200/0414* (2013.01); *F02D 2200/0802* (2013.01); *F02D 2200/101* (2013.01); *F02D 2200/703* (2013.01)

(58) Field of Classification Search
CPC ....... F02D 2200/0802; F02D 2200/101; F02D 2200/703
See application file for complete search history.

(56) References Cited

U.S. PATENT DOCUMENTS

| | | |
|---|---|---|
| 6,834,496 B2 | 12/2004 | Nakatani et al. |
| 7,104,051 B2 | 9/2006 | Shimasaki et al. |
| 8,099,953 B2 | 1/2012 | DeHart |
| 10,167,795 B2 | 1/2019 | Disaro' et al. |
| 10,233,871 B2 | 3/2019 | Huang et al. |
| 10,598,109 B2 | 3/2020 | Mehta |
| 2004/0159312 A1 | 8/2004 | Hummel |
| 2005/0109029 A1 | 5/2005 | Busch |
| 2010/0139267 A1 | 6/2010 | Schliesche et al. |
| 2011/0225955 A1 | 9/2011 | Kimura et al. |
| 2017/0120756 A1 | 5/2017 | Yokoyama et al. |
| 2020/0224573 A1 | 7/2020 | Williges et al. |
| 2020/0271046 A1 | 8/2020 | Kelly et al. |

FLOW ESTIMATION FOR SECONDARY AIR SYSTEM

CROSS REFERENCE TO RELATED APPLICATIONS

The present application is a continuation of U.S. patent application Ser. No. 17/869,633, filed Jul. 20, 2022 and titled FLOW ESTIMATION FOR SECONDARY AIR SYSTEM, the disclosure of which is incorporated herein by reference.

BACKGROUND

Tightening emissions controls on internal combustion engines have created a range of incentives for new and different control systems, including focus on air path control. Exhaust gasses coming out of a combustion chamber are directed to various aftertreatment systems, including, for example and without limitation, three-way catalyst (TWC) devices, which convert toxic pollutants like carbon monoxide, hydrocarbons (such as partially or unburnt fuel), and nitrogen oxides into carbon dioxide, water, and/or nitrogen. When the TWC is cold, such as at a cold start of the engine, the desired catalytic reactions will not occur. One solution is to heat the TWC using, for example, an electric heat element. Another solution is to operate the engine to generate deliberately rich exhaust, and introduce ambient or fresh air into the exhaust upstream of the TWC device to cause oxidation (burning) of the unburnt fuel so as to bring the TWC up to operating temperature quickly. The introduction of fresh air, having higher oxygen levels than the exhaust, is referred to as secondary air injection (SAI).

One approach for introducing such fresh air is to pump fresh air into the exhaust airstream at desired locations using, for example, a "smog pump" with a check valve to prevent reverse exhaust flow. This approach adds an extra system and associated control mechanism, making both implementation and control complex. Another approach is to introduce charged air (that is, pressurized air exiting a compressor upstream of the engine) through a secondary air valve into the exhaust flow, a process that can be controlled by the use of a flow sensor through which the secondary air flow passes. Such flow sensors add cost and introduce an additional point of potential failure and/or error in the system, as flow sensors are subject to reduced flow and/or failure due to clogging.

These older approaches introduce cost and complexity. New and alternative approaches are desired for the introduction of secondary air.

Overview

The present inventors have recognized, among other things, that a problem to be solved is the need for new and/or alternative method for introducing secondary air. Fresh air is introduced to the exhaust airstream from within the airflow exiting the compressor of a turbocharger used with the engine. The turbocharger may be a traditional turbocharger, obtaining all power for use in the compressor from a turbine in the exhaust airstream. In some implementations, the turbocharger may be an E-Turbo device, which uses an electric motor to selectively provide additional torque to the compressor. Rather than relying on a flow sensor in line with the secondary air valve, the presently disclosed methods estimate secondary air flow using a standard production sensor set, and implement system controls based on such estimates.

A first illustrative, non-limiting example takes the form of a method of estimating secondary air flow in an engine system, the engine system including: a combustion engine having at least one combustion chamber, an intake manifold having intake manifold pressure and temperature sensors and an exhaust manifold, a turbocharger having a compressor and a turbine configured to provide torque to the compressor, a charge air cooler (CAC), and an aftertreatment system including an environmental catalyst device (ECD), the engine system configured to receive ambient air, compress the ambient air in the compressor, cool the compressed air in the CAC, provide cooled compressed air to the intake manifold, combust a quantity of fuel with the cooled compressed air in the at least one combustion chamber thereby generating exhaust, route the exhaust to the turbine, and route exhaust from the turbine to the aftertreatment system, the engine system also including a secondary air injection (SAI) valve to controllably deliver compressed air from a first location downstream of the compressor to the exhaust at a second location, the SAI valve controlled by an SAI control signal; the method comprising: sensing an intake manifold pressure and an intake manifold temperature; sensing an ambient air pressure, a boost pressure downstream of the CAC, and an engine speed; calculating a first pressure at the first location using the boost pressure and a CAC flow model; calculating a first temperature at the first location using a model of the compressor; calculating an exhaust manifold pressure; and calculating a mass flow through the SAI valve from a model of the SAI valve using the first pressure, the first temperature, the exhaust manifold pressure, and the SAI control signal as inputs to the SAI model.

Additionally or alternatively, a method as in the preceding example may further comprise adjusting the SAI control signal in response to the calculated mass flow through the SAI valve. Additionally or alternatively, a method as in the preceding example may further comprise determining that the engine has been started in a cold start condition; issuing a control signal to open the SAI valve; modulating a position of the SAI valve responsive to the calculated mass flow through the SAI valve; determining that the ECD temperature is above an ECD temperature threshold; and issuing a control signal to close the SAI valve. Additionally or alternatively, the turbocharger includes an electric motor configured to selectively provide torque to the compressor, and the method also includes activating the electric motor of the turbocharger to provide torque to the compressor to raise pressure at the first location. Additionally or alternatively, the turbocharger includes an electric motor configured to selectively provide torque to the compressor, and the method also includes determining whether a pressure differential between the first location and the second location is greater than a pressure differential threshold and, if not, activating the electric motor of the turbocharger to provide torque to the compressor to raise pressure at the first location.

Additionally or alternatively, the first location is upstream of the CAC, and the second location is the exhaust manifold. Additionally or alternatively, the second location is downstream of the turbine and upstream of the ECD.

Additionally or alternatively, the steps of calculating the exhaust manifold pressure and calculating the mass flow through the secondary air valve is performed using an iterative calculation to solve these mass flow equations: mass flow into the intake manifold plus mass of the quantity of fuel plus mass flow through the secondary air valve equals turbine mass flow; turbine mass flow equals mass flow through the after-treatment system.

Additionally or alternatively, the engine system further comprises a wastegate positioned to allow exhaust to bypass the turbine, and the turbine mass flow includes mass flow passing through the turbine and mass flow bypassing the turbine via the wastegate.

Additionally or alternatively, the turbine is a variable geometry turbine (VGT).

Additionally or alternatively, the turbocharger includes an electric motor configured to selectively provide torque to the compressor, further wherein, if the SAI valve is not closed, the method comprises determining whether a pressure at the first location exceeds a pressure at the second location and, if not, activating the electric motor to supply torque to the compressor and thereby increase pressure at the first location.

Additionally or alternatively, the aftertreatment includes a particulate filter (PF), and the method further comprises: determining that the PF requires refreshing; issuing a control signal to open the SAI valve to allow secondary air flow for use in refreshing the PF; modulating a position of the SAI valve responsive to the calculated mass flow through the SAI valve; determining that the PF have been refreshed; and issuing a control signal to close the SAI valve.

Another illustrative, non-limiting example takes the form of a method of controlling an engine, the engine having a combustion chamber with an intake manifold and an exhaust manifold, a turbocharger with a compressor and a turbine, an aftertreatment system including an environmental catalyst device (ECD) and a lambda sensor, and a secondary air injection (SAI) valve controlled by an SAI control signal and configured to deliver charged air exiting the compressor at a first location to a second location in the exhaust path between the exhaust manifold and the ECD, the method comprising: determining the occurrence of a transient engine operation and a temperature of the ECD below an ECD temperature threshold; opening the SAI valve to enable secondary air injection to the exhaust to facilitate heating the ECD; during the transient engine operation, modulating the SAI control signal to adjust a position of the SAI valve using an open loop control strategy by calculating a mass flow through the SAI valve from a model of the SAI valve; determining an end of the transient engine operation while the temperature of the ECD remains below the threshold; and upon the end of the transient engine operation, modulating the SAI control signal to adjust a position of the SAI valve using a closed loop control strategy by obtaining an output of the lambda sensor.

Additionally or alternatively, the engine also includes a charge air cooler (CAC) for cooling air exiting the compressor, and a throttle between the CAC and the intake manifold, a first sensor for sensing an intake manifold pressure, a second sensor for sensing an intake manifold temperature, a third sensor for sensing an ambient air pressure, a fourth sensor for sensing a boost pressure downstream of the CAC and upstream of the throttle, and a fifth sensor for sensing an engine speed; and the step of calculating a mass flow through the SAI valve from a model of the SAI valve comprises: sensing an intake manifold pressure from the first sensor, an intake manifold temperature from the second sensor, an ambient air pressure from the third sensor, a boost pressure from the fourth sensor, and an engine speed from the fifth sensor; calculating a first pressure at the first location using the boost pressure and a CAC flow model; calculating a first temperature at the first location using a model of the compressor; calculating an exhaust manifold pressure; and estimating a mass flow through the SAI valve from a model of the SAI valve using the first pressure, the first temperature, the exhaust manifold pressure, and the SAI control signal as inputs to the SAI model. Additionally or alternatively the transient engine condition is a cold start of the engine.

Another illustrative and non-limiting example takes the form of a method of estimating secondary air flow (SAI) in a controller for an engine system, the engine system including a combustion chamber coupled upstream to an intake manifold (IM) and downstream to an exhaust manifold, a turbocharger having a compressor upstream of the intake manifold and a turbine downstream of the exhaust manifold, a throttle downstream of the compressor and upstream of the IM, and an SAI flow path including an SAI valve, the SAI flow path coupled from a first location downstream of the compressor and upstream of the combustion chamber to a second location downstream of the compressor, the method comprising, with an SAI control signal provided to the SAI valve that causes the SAI valve to be at least partially open, the controller performing the following: obtaining an IM pressure and an IM temperature from sensors in the IM; obtaining an ambient air pressure from an ambient air pressure sensor, a boost pressure from a boost pressure sensor located upstream of the throttle, and an engine speed from an engine speed sensor; calculating a first pressure at the first location using the boost pressure; calculating a first temperature at the first location using a compressor model; calculating an exhaust manifold pressure; and estimating a SAI mass flow through the SAI flow path using a model of the SAI valve, the IM pressure, the first pressure, the first temperature, the exhaust manifold pressure, and the SAI control signal.

Additionally or alternatively, a method may include determining the estimated SAI mass flow is lower than a target SAI mass flow and, in response, modifying the SAI control signal to open the SAI valve. Additionally or alternatively, a method may include determining the estimated SAI mass flow is lower than a target SAI mass flow and, in response, modifying operation of the turbocharger to increase the boost pressure. Another illustrative and non-limiting example takes the form of a method of controlling an engine system having a secondary air (SAI) flow path, comprising: identifying a cold start condition; opening an SAI valve in the SAI flow path; using a method as in any of the preceding examples to estimate SAI mass flow; and modulating a control signal delivered to the SAI valve to increase or decrease SAI mass flow in response to the estimated SAI mass flow.

Another illustrative and non-limiting example takes the form of a method of controlling an engine system having a secondary air (SAI) flow path, comprising: identifying a need to refresh a particulate filter; opening an SAI valve in the SAI flow path to allow secondary air flow for use in refreshing the particulate filter; using a method as in any of the preceding examples to estimate SAI mass flow; and modulating a control signal delivered to the SAI valve to increase or decrease SAI mass flow in response to the estimated SAI mass flow.

Another illustrative, non-limiting example takes the form of a combustion engine having at least one combustion chamber, an intake manifold having intake manifold pressure and temperature sensors and an exhaust manifold, a turbocharger having a compressor and a turbine configured to provide torque to the compressor, a charge air cooler (CAC), and an aftertreatment system including an environmental catalyst device (ECD), the engine system configured to receive ambient air, compress the ambient air in the compressor, cool the compressed air in the CAC, provide cooled compressed air to the intake manifold, combust a quantity of fuel with the cooled compressed air in the at least one combustion chamber thereby generating exhaust, route the exhaust to the turbine, and route exhaust from the turbine to the aftertreatment system, the engine system also including a secondary air injection (SAI) valve to controllably deliver compressed air from a first location downstream of the compressor to the exhaust at a second location, the SAI valve controlled by an SAI control signal, and a controller configured to perform a method of estimating SAI mass flow and/or controlling an engine as in any of the preceding method examples.

Still another illustrative, non-limiting example takes the form of a controller for a combustion engine configured to perform a method as in any of the preceding method examples. Another illustrative, non-limiting example takes the form of a non-transitory medium storing thereon instructions for performing any of the preceding method examples.

This overview is intended to introduce the subject matter of the present application. It is not intended to provide an exclusive or exhaustive explanation. The detailed description is included to provide further information about the present application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
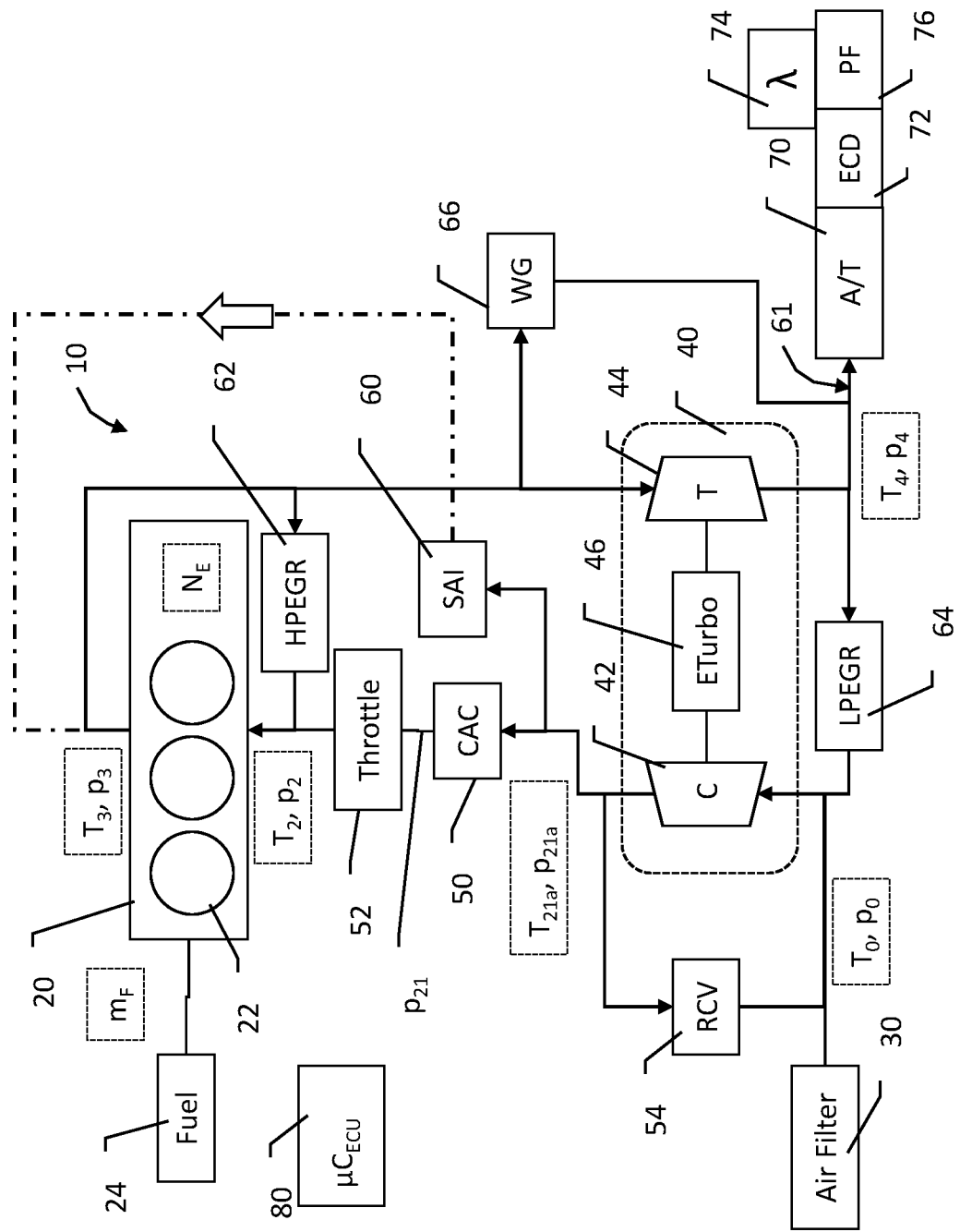
FIG. 1 shows an illustrative engine with a turbocharger and secondary air injection.

FIG. 1 shows an illustrative engine with a turbocharger. The system 10 includes an engine 20 having one or more cylinders 22, which receives fuel from a fuel system 24, such as by one or more fuel injectors. The fuel system 24 provides a known or set quantity of fuel for each firing of each cylinder 22, making for a determined quantity of fuel for each full firing sequence of the engine's cylinders. The speed of the engine, $N_E$, represents the speed at which a full firing sequence takes place (whether or not all cylinders are active), and is sensed by an engine speed sensor, such as, for example and without limitation, a variable reluctance sensor, a Hall effect sensor, or an optical sensor.

The airflow of the system includes fresh air intake passing through an air filter 30 and then going to a turbocharger 40 having a compressor 42 and turbine 44 linked together by a drive shaft. The engine and/or vehicle will usually also include ambient air temperature and pressure sensors. The turbocharger 40 is configured to receive exhaust gasses at the turbine 44, generating torque which is provided by a drive shaft to the compressor 42. The turbocharger 40 may be, optionally, an electric assisted turbocharger (E-Turbo), having an electric motor 46 which can provide additional torque to the compressor 42 when desired.

Air exiting the compressor 42 is considered the "charged" air flow, having been compressed, and it passes through a charge air cooler 50 to reduce temperature, and then to a throttle 52. To prevent turbocharger surge (reverse airflow through the compressor 42 which can be caused by pressure imbalances responsive to closing of the throttle 52), a recirculation valve 54 is provided to allow charged air to recirculate back to the compressor 42 input when possible surge conditions are present.

After passing through the throttle 52, the charged fresh air reaches the intake manifold of the engine 20. Prior to entering the intake manifold the charged fresh air may be mixed with recirculated exhaust gasses that pass through a high-pressure exhaust gas recirculation (HPEGR) valve 62, which will typically also pass the recirculated gas through an EGR Cooler (not shown). The recirculated exhaust gas aids in reducing combustion temperatures in the engine 20, reducing certain noxious emissions. Alternatively or additionally, the system may include a low-pressure exhaust gas recirculation (LPEGR) valve, shown at 64 and an associated EGR cooler (not shown).

HPEGR 62 is more typical of diesel engines, while LPEGR 64 is more common with gasoline engines. Either or both may be included or omitted, as desired. The present disclosure is mainly directed toward implementation in a gasoline engine, however, the systems and methods for estimating secondary air flow may also be used in a diesel engine, or in engines burning other fuels. Such combustion engines may serve as the only power source in a vehicle, or may be combined with additional power systems, such as electric drive systems in a hybrid vehicle, if desired.

The intake manifold typically includes each of an intake manifold pressure sensor and an intake manifold temperature sensor. Air entering the intake manifold then enters the combustion chambers 22. During combustion the charged air mass is combined with the fuel mass, $m_F$. Exhaust gasses leave the engine at an exhaust manifold. Exhaust gasses are then directed to the turbine 44, which obtains torque/force from the exhaust gas that is in turn applied via the drive shaft to the compressor 42. In some examples the speed of rotation of the turbocharger drive shaft is a measured variable, referred to as turbocharger speed. A turbocharger speed sensor may be provided in some examples, but is not always present, and may take the form of, for example and without limitation, a variable reluctance sensor, a Hall effect sensor, or an optical sensor.

A wastegate 66 allows venting of exhaust gas without passing through the turbine 44 to control turbocharger speed. Rather than a wastegate 46, a variable geometry turbine (VGT) may be used to manage gasses entering the turbine 44, if desired.

Gasses exiting the system either via the turbine 44 or the wastegate 46 go to an aftertreatment system 70 where various aftertreatment devices may remove or reduce pollutants. An environmental catalyst device (ECD) 72 is included in the aftertreatment system 70, and is of particular note in the present innovation. An ECD may take the form of a three-way catalytic converter (TWC), which would be typical for a gasoline engine, or a selective catalytic reduction device (SCR), which would be typical for a diesel engine.

A TWC may include a substrate brick coated with a washcoat containing the catalytic material. To convert carbon monoxide, hydrocarbons, and nitrous oxides into carbon dioxide, water, and nitrogen gas, the TWC needs to be at or above a threshold temperature, typically in the range of 400 degrees Celsius (though this may vary with the particular TWC). When the TWC is too cool, such as at engine startup, the TWC will not perform its function.

Most SCR devices inject urea to form ammonia in an SCR bed. To convert the urea to ammonia and cause reaction with pollutants that are desired to be reduced also requires the SCR bed to be at or above a threshold temperature, with desirable targets exceeding 250 degrees Celsius, more often over 300 degrees Celsius. When the SCR bed is too cool, such as at engine startup ("cold start"), the SCR will fail to perform its function.

An ECD may take other forms for use with other fuels, and may have different needs as well. For example, with a natural gas engine, methane emissions may need to be controlled, but may require even higher temperatures for catalytic conversion. It may be useful in some implementations to have more than one ECD at different locations to allow for different temperatures to optimize different reactions. The temperatures ranges noted above are merely illustrative, and may vary with particular fuels, different ECD types, and/or other factors. In any event, in some examples, raising ECD bed temperature quickly enables better conformity to emissions standards.

A cold start, as used herein, may be defined in various ways. In some examples, "cold start" may be determined by whether the engine starts after at least a minimum period of non-operation, where the minimum period of non-operation may be in the range of 15 minutes to 7 hours. A "cold start" may instead by determined by whether the engine starts while the ECD bed is at a temperature that is below a cut-off for correct operation of the ECD, where the cutoff temperature is in the range of about 50 to about 400 degrees Celsius.

Figure 4:
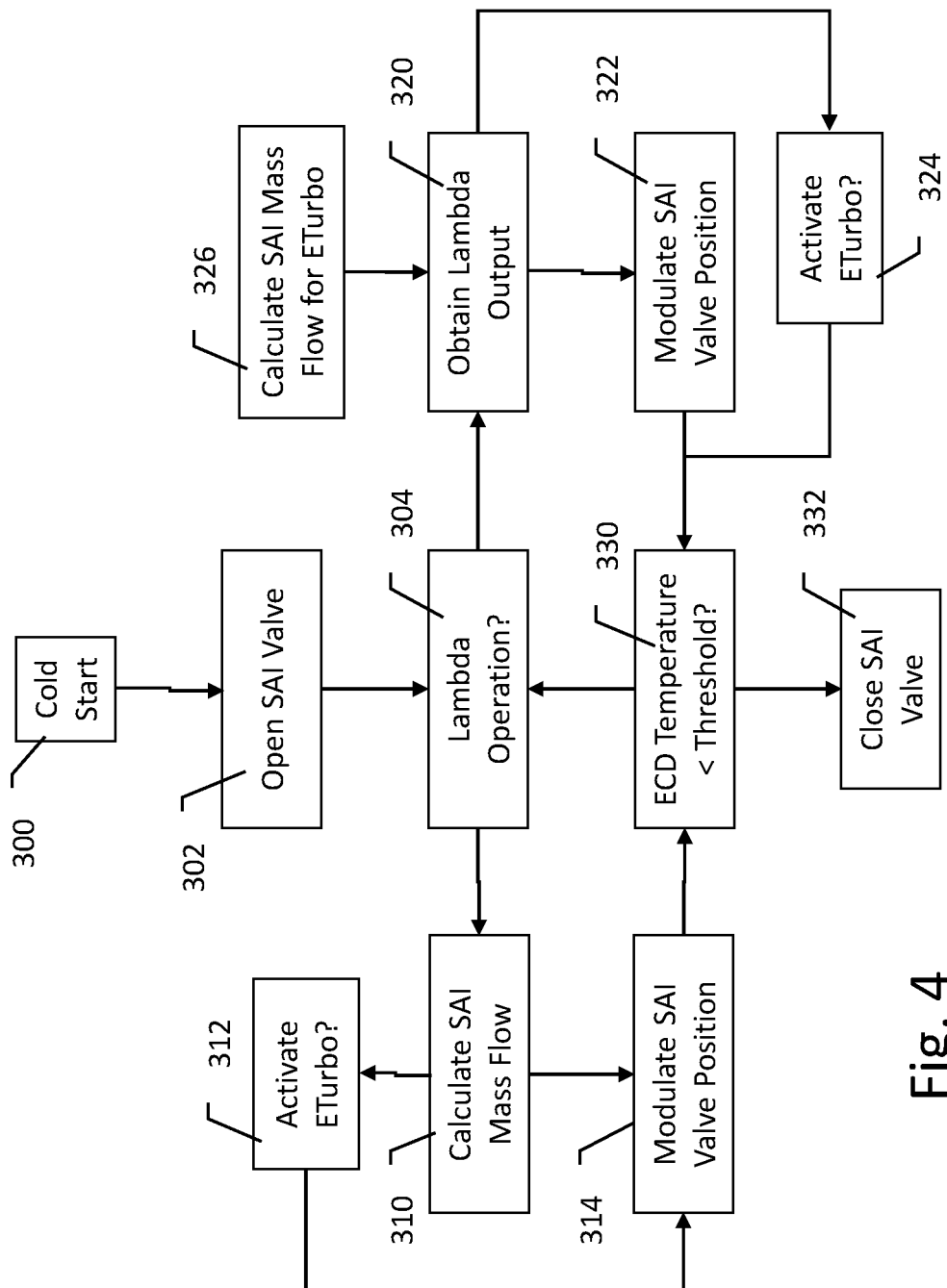

One or more lambda sensors or universal exhaust gas oxygen (UEGO) sensors 74 (collectively referred to as Lambda sensors herein) may be provided, including, for example and without limitation, at a location downstream of the aftertreatment system 70, and/or upstream of the turbine 44, as desired. A "cold start" may instead refer to a status of the Lambda sensor condition, where the minimum operating temperature of the Lambda sensor 74 will typically be in the range of about 300 to 350 degrees Celsius. Until the Lambda sensor 74 reaches its operating temperature, the Lambda sensor 74 output will be unavailable or unreliable, and a model-based mass flow is used rather than Lambda sensor 74 outputs. In some examples, as shown in FIG. 4 below, a "cold start" may be the basis for performing certain operations, and the underlying control over such operations can vary in response to Lambda sensor 74 operational status.

The measured oxygen concentration from the Lambda sensor can be used to determine air to fuel ratio in the engine 20, for example, and is often used to determine adjustments to the air to fuel ratio which can be implemented by modifying fuel input and/or operation of the turbocharger 40. One problem with Lambda sensors 74 is that the sensor output is subject to sensor lag (delayed response), making the Lambda sensor 74 a poor indicator of current conditions when operations are changing (transient). Another issue at cold start is that the Lambda sensor 74 operating range requires elevated temperatures, making the Lambda sensor output temporarily unusable during cold starting.

The system may also include a particulate filter 76, such as a diesel or gasoline particulate filter, or other particulate filters adapted for other fuels, as is known in the art.

A secondary air injection (SAI) air path is also provided, including an SAI valve 60. The SAI valve 60 may be a non-return valve to prevent backflow of exhaust. SAI can be used to deliver additional oxygen to the exhaust gas flow when desired, for example, to cause post-oxidation ("post-combustion") reaction with exhaust gas constituents, in particular, the carbon monoxide and unburned hydrocarbons that are produced during cold start. Not only do these reactions reduce the presence of the harmful exhaust components, but the reactions are also exothermic, creating heat that helps bring the ECD bed up to its operating temperature. In the example shown, the SAI path starts at a first location, downstream of the compressor 42 and upstream of the CAC 50, and delivers the fresh air to a second location which may be at the exhaust manifold of the engine 20 (as shown with the heavy broken line in FIG. 1). Alternatively, the SAI path may bring the fresh air into the exhaust flow at any location downstream of the exhaust manifold and upstream of the turbine. Another alternative would be for the second location to be located at 61, downstream of the turbine 44 and wastegate 66 (if present), and upstream of the aftertreatment 70 and ECD 72. Each line between elements in the air path, including the broken line shown for the SAI air path, may represent a tube, channel, pipe or other suitable air passageway.

Small boxes are shown throughout the figure representing temperature and pressure at various locations:

$T_0$, and $p_0$ represent the ambient air temperature and air pressure $T_{21a}$, and $p_{21a}$ represent pressure and temperature at the outlet of the compressor 42;

$T_2$, and $p_2$ represent pressure and temperature at the intake manifold;

$T_3$, and $p_3$ represent pressure and temperature at the exhaust manifold; and $T_4$, and $p_4$ represent pressure and temperature at the outlet of the turbine 44.

In a production system, the ambient air temperature and pressure ($T_0$, and $p_0$), and the intake manifold pressure and temperature ($T_2$ and $p_2$) may be measured parameters, and other pressures and temperatures are estimated, calculated and or inferred using a model of the system and other characteristics. Engine speed ($N_E$) will also be known, as is the mass input via the fuel injectors of the engine 20, and the output of the lambda sensor. In some examples, the turbocharger speed may be measured.

In the illustrative system, one additional pressure sensor, $p_{21}$ may be provided at the location shown as part of the production system, obtaining pressure downstream of the CAC 50 and upstream of the throttle 52. The $p_{21}$ sensor is used to compute $p_{21a}$ using a CAC restriction model. The temperature $T_{21a}$ would be computed using a compressor temperature rise model, which in turn uses the computed $p_{21a}$ value, $T_0$, and $p_0$.

In a system under test, such as a build/system used for modelling, additional sensors may be present throughout the system for capturing temperatures, pressures or other parameters as desired. The added sensors aid in the development and calibration of models used in production systems to estimate, calculate or infer the various pressures, temperatures, mass flows, etc. as needed. For example, the compressor temperature rise model and CAC restriction model can each be developed using additional sensors for a system under test to directly sense $T_{21a}$ and $p_{21a}$.

The operation in general is controlled by an engine control unit (ECU) 80. The ECU 80 may include a microcontroller or microprocessor, as desired, or other logic/memory, application specific integrated circuit (ASIC), etc., with associated memory for storing observed characteristics as well as operational instruction sets in a non-transitory medium, such as a Flash or other memory circuitry. The ECU 80 will be coupled to various actuators throughout the system, as well as to the provided sensors, to obtain data and issue control signals as needed. The ECU may couple to other vehicle control systems such as by a controller area network (CAN) bus or other wired or wireless link. Multiple ECUs 80 may be present, such as by having a separate ECU dedicated to controlling the turbocharger 40.

Mass flow through the system can be understood by taking one piece at a time. The flows into and out of the exhaust manifold from the combustion chambers and secondary air valve may be represented as shown in Formula 1:

$$0 = m_{eng}(p_2, p_3, T_2, N_e, \text{Cams}) + m_f + m_{SAI}(p_{21a}, p_3, T_{21a}, u_{SAI}) - m_{HPEGR}(p_2, p_3, T_3, u_{HPEGR}) - m_{turbine}(p_3, p_4, T_3, N_t) - m_{wg}(p_3, p_4, T_3, u_{WG}) \quad \{1\}$$

Where the function $m_{eng}$ is developed using a system under test as a function of the intake manifold pressure and temperature, the pressure in the exhaust manifold, the engine speed, and the cam shaft positions ($C_{AMS}$), such as variable lift or phasing, (the equation can be modified to include any other signal that influences the charge air flow), and outputs the mass of charge air flowing into the engine. Mass flow of the fuel ($m_f$) is a function of the settings of the fuel system input.

The secondary air flow mass function, $m_{SAI}$, is a function of the pressures $p_{21a}$ and $p_3$, temperature $T_{21a}$, and the control signal for the SAI valve, $u_{SAI}$, and is a flow model for the SAI valve that would be developed in a system under test. The high pressure EGR mass flow, $m_{HPEGR}$, is a function of $p_2$, $p_3$, $T_3$, and the HP EGR control signal, $u_{HPEGR}$. The mass flow through the turbine and wastegate are each separated in Formula 1. Specifically, the mass flow though the turbine, $m_{turbine}$ is the function of $p_3$, $p_4$, $T_3$, and the turbine speed, $N_t$, (which may itself be measured or modelled, as desired). Mass flow through the wastegate, $m_{wg}$, is a function of $p_3$, $p_4$, $T_3$, and the wastegate position or control signals, $u_{wg}$.

The combined mass flow through the turbine and wastegate, must be equal to the mass flow into the exhaust system, as shown by Formula 2:

$$0 = m_{turbine}(p_3, p_4, T_3, N_t) + m_{wg}(p_3, p_4, T_3, u_{WG}) - m_{aft}(p_4, p_0, T_4, u_{LPEGR}) \quad \{2\}$$

The function, $m_{aft}$, is the mass flow through the exhaust system before any low pressure (LP) EGR loop. As shown, $m_{aft}$ is a function of the post-turbine pressure $p_4$ and temperature $t_4$, ambient pressure $p_0$, and the LP EGR valve position or valve control signal, $u_{LPEGR}$. The model for mass flow through the low pressure EGR, $m_{LPEGR}$ would be developed using a system under test, and relies on pressures $p_4$ and $p_0$, and temperature $T_4$, along with the LPEGR control signal, $u_{LPEGR}$.

For a system with VGT, the turbine model would be replaced with a flow model that includes relationship of the vane position, uVGT and the wastegate model could be removed, substituting the following in place of $m_{wg}$ in formulae 1 and 2:

$$m_{turbine}(p_3, p_4, T_3, N_t, u_{VGT})$$

Equations 1-2 come from the same system and account for each mass flow input and output of the system across a controlled volume. These two nonlinear equations are sufficient to uniquely solve the flow balance from a standard sensor set. Any iterative solver, such as a Gauss-Newton, Newton-Raphson, or iterated Kalman Filter can be used to solve the two unknown pressures $p_3$ and $p_4$, and therefore calculate each mass flow and extract from the mass flows the quantity of mass flowing through the SAI valve. SAI valve position can then be modulated (opened and closed based on a target value for the SAI flow) using any suitable control method, such as proportional-integral-derivative (PID) control, model-based control such as model predictive control (MPC), etc. Additionally or alternatively, E-Turbo control or torque may be modified. In still other examples, settings of the turbocharger wastegate and/or VGT may be modified, for example, to increase charge air pressure to increase SAI flow.

The formula set can be revised to account for other layouts, as desired.

With the system as shown in FIG. 1, it may be noted that the cold start engine condition in which SAI would be used may be an idle (or high idle) state. In some examples, to augment the operation of the compressor during the idle state, the E-Turbo 46 may be used to increase the speed of the compressor, raising boost pressure $p_{21}$ and pressure $p_{21a}$ in turn, and thereby affecting (increasing) SAI mass flow.

Figure 2:
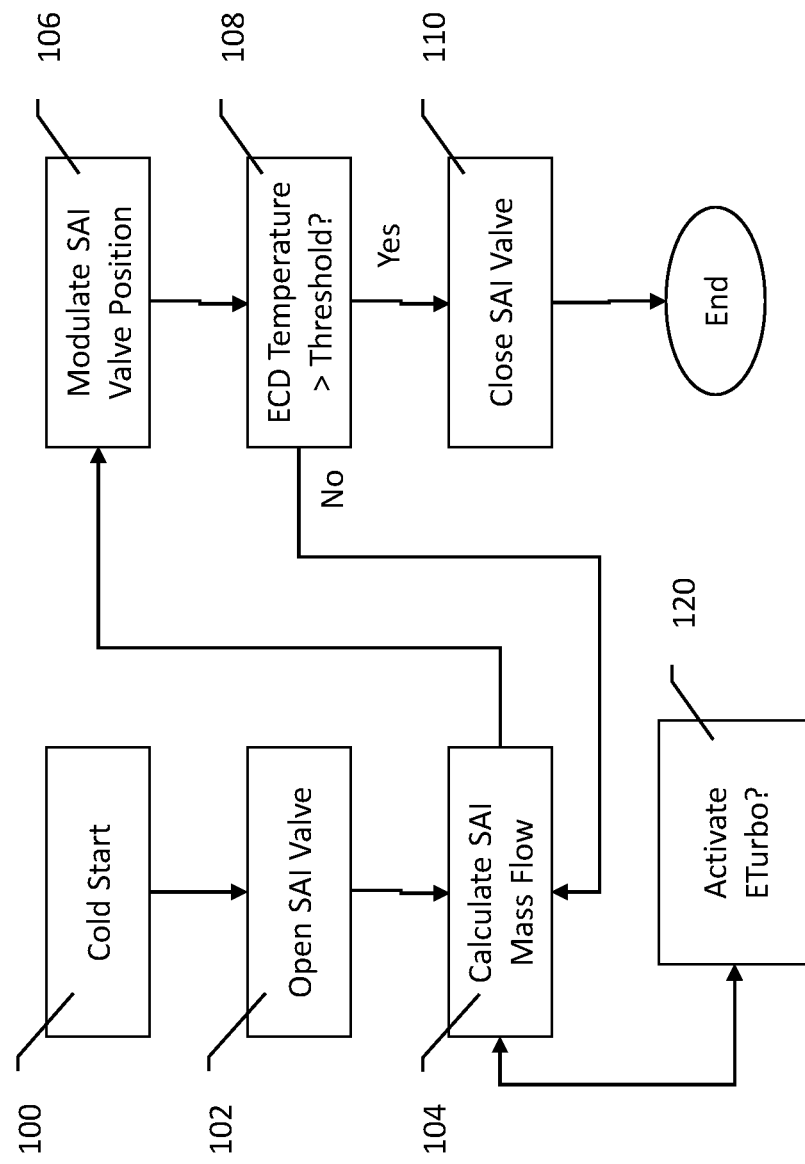
FIGS. 2-4 each show illustrative methods in block form.
Figure 3:
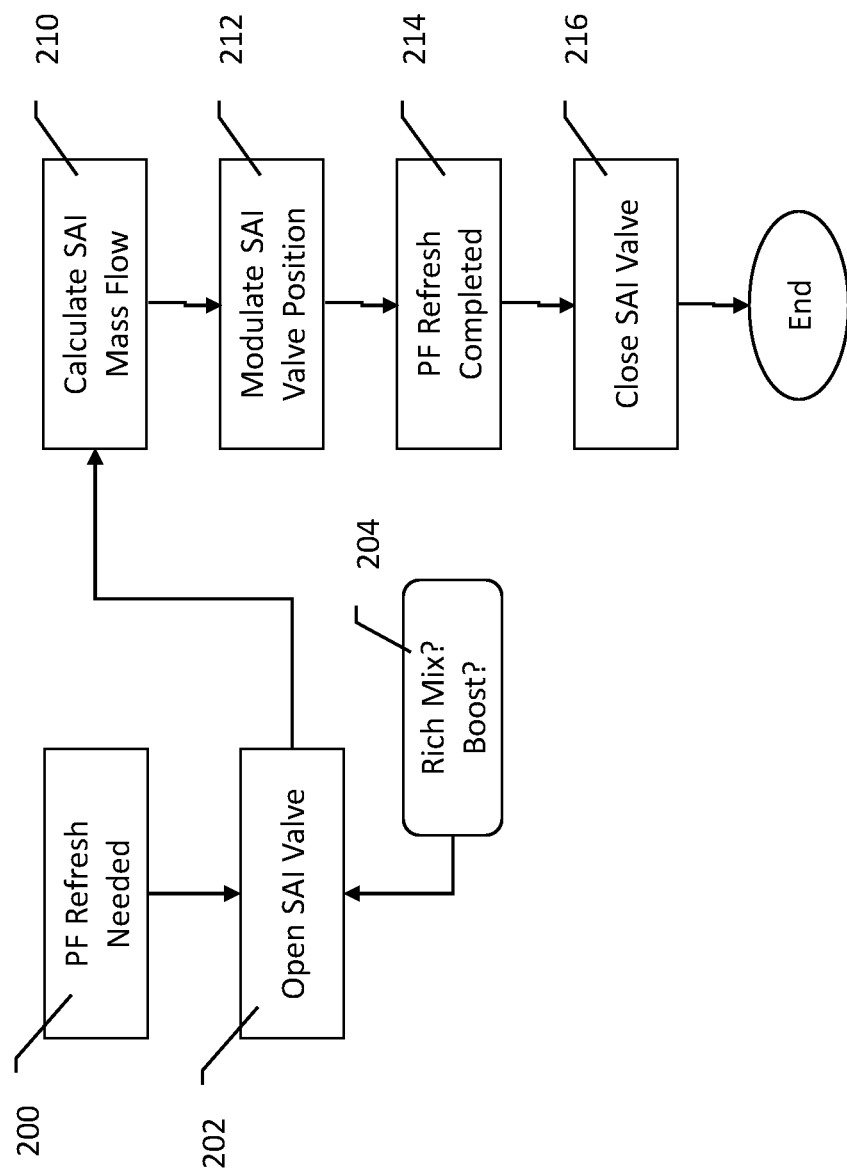

FIGS. 2-4 each show illustrative methods in block form. Starting with FIG. 2, a cold start is identified, as indicated at 100. A cold start may be identified by determining how much time has passed between cessation of prior engine operation and initiation of engine operation, where if more than a selected time duration (for example in the range of 30 minutes to 7 hours) has passed, a cold start is identified. A cold start may be identified in other examples by reference to a sensed temperature of the ECD, the ECD bed, or a Lambda sensor, where if the temperature of one or more of these elements is less than an operational threshold (typically 300 Celsius or more, though other values can be used depending on preferences, fuel type, catalyst type, and the particular implementation), a cold start is identified. Boolean combination of such factors may be used, for example, a cold start may be identified if more than 30 minutes have passed since the engine was last in use and the ECD bed temperature is below the operational threshold.

Having identified the cold start, the SAI valve is opened, as indicated at 102. SAI mass flow is next calculated at 104, using for example, equations 1-3 above in an iterative solver. The SAI valve position is modulated as indicated at 106, for example, to open the SAI valve position if SAI mass flow is below a determined target, or to close the SAI valve if the SAI mass flow is above a determined target, by modifying an SAI valve control signal. It may be noted here that with the method described, no flow sensor is needed for the SAI valve or SAI system to calculate the mass flow therethrough.

Next, at block 108, the method determines whether continued operation is needed by determining whether the ECD temperature (or ECD bed temperature) is above an operating threshold. The actual threshold may vary by installation and ECD design. If the ECD temperature is not above the threshold at 108, the method returns to block 104, for a next iteration of the method. If the ECD temperature has reached or exceeded the threshold at block 108, the method next closes the SAI valve at 110, as further SAI flow is not required for warming the ECD and/or pollutants from the exhaust flow, and the method ends.

Block 120 is also shown in in the illustrative method, and may be operable at any point in the method. In block 120, a comparison of the pressure upstream of the SAI valve to the pressure downstream of the SAI valve is made to find a pressure differential. For example the pressure in the exhaust manifold may be compared to the pressure at the compressor outlet. Depending on layout, other comparisons can be made. If the pressure differential is below a threshold, more boost pressure is desired from the compressor, and so the E-Turbo motor is activated to provide additional torque to the compressor, increasing compressor speed and raising the pressure upstream of the SAI valve. Block 120 may be omitted for systems that do not have an E-Turbo motor. If the comparison is to pressure in the exhaust manifold, the pressure in the exhaust manifold may vary widely, and so any of a minimum pressure, a maximum pressure, or an average pressure at the exhaust manifold may be used in calculating the pressure differential.

In an example, activation of the E-Turbo may be performed using the following approach. First, the control system may measure and/or calculate the pressures that are relevant to SAI mass flow. Note, for example, as shown above, that SAI mass flow is a function of the pressures $p_{21a}$ and $p_3$, temperature $T_{21a}$, and the control signal for the SAI valve, $u_{SAI}$. In an example, addition of torque to the turbocharger by the electric motor of the E-Turbo is activated by calculating whether the pressure differential is above or below a threshold from the following:

If $p_{21a}-p_3<X$, add torque

Else, reduce E-Turbo torque to Standard

Where the value for X may be a function of $T_{21a}$, recognizing that such a temperature impacts the SAI mass flow, and where "Standard" is the E-Turbo torque input calculated through any other system control methods. For example, a system may include a control sub-function used to calculate the E-Turbo torque that is desired relative to the engine cylinders, without consideration of SAI mass flow. In another example, when SAI mass flow is desired, the system may again compare $p_{21a}$ and $p_3$ and determine whether to open or close the wastegate, or adjust vane settings with the VGT, to increase power to the compressor of the turbocharger and thereby increase $p_{21}$ and $p_{21a}$.

Any condition for which a response of heating a portion of the system using SAI may serve at block 100 to initiate the process of FIG. 2, which an adjustment made to block 108 to determine when the SAI process has reached a completion point.

In another example, an engine status or condition other than "cold start" may be used at block 100 to initiate the method. For example, in a system having an ammonia/NOx sensor in the exhaust flow, the detection of excess ammonia can be indicative of ammonia slip associated with excess urea introduction on a selective catalytic reduction (SCR) device and/or low SCR bed temperature. When excess ammonia is detected, a special mode to increase SCR bed temperature can be called such as by detecting SCR bed temperature and determining that an increase in SCR bed temperature is needed (within a maximum limit) to a new SCR bed temperature target, which would serve as the ECD temperature threshold in block 108. For example, the new SCR bed temperature target may be set as some quantity of degrees Celsius (20 degrees C., for example) increase from whatever the temperature is at the time the excess ammonia slip is found. Having detected excess ammonia slip, and having set a new SCR bed temperature target, the method of FIG. 2 can be used to open the SAI valve at 102, calculate SAI mass flow (potentially with activation of the E-Turbo at 120), modulation of SAI valve position at 106, and the temperature target check at 108 to determine if the SCR bed temperature has reached the new SCR bed temperature target.

FIG. 3 illustrates a special mode that can be used for refreshing a particulate filter (PF). The PF captures and stores exhaust soot in order to reduce emissions. The PF may be designed for a specific fuel, and may take the form of, for example and without limitation, a diesel particulate filter or a gasoline particulate filter, or any other fuel particulate filter. Trapped soot may occasionally or periodically be burned off using an operation as show in FIG. 3. First, as shown at 200, it is determined whether a PF refresh is needed, such as by determining how much time has passed since a last refresh, or by monitoring the quantity of soot in the PF, the quantity of soot passing by the PF, or by determining a flow resistance at the PF. If PF refresh is needed at 200, the method opens the SAI valve at 202 to increase the amount of oxygen available in the exhaust, and may, as indicated at 204 initiate a rich combustion routine by increasing fuel injection. The combination of fresh air injection via the SAI, and the rich combustion state, will lead to burn off in the aftertreatment. The SAI mass flow is calculated at 210, and the calculated mass flow is used to modulate SAI position at 212, similar to block 106, above. After a period of time has passed, or in response to sensing a temperature at the PF has reached or exceeded a threshold (for example, above a threshold for a period of time), PF refresh complete is declared at 214, and the SAI valve is closed as indicated at 216.

FIG. 4 illustrates another method for managing a cold start. Here, the cold start is identified at 300, similar to block 100 in FIG. 2. At block 302, the SAI valve is opened by issuing a control signal to the SAI valve. Next the method determines whether the Lambda sensor is operating 304. Block 304 may include several considerations, including in some examples, whether the temperature of the Lambda sensor is in an operational range. Block 304 may also contemplate whether the system is operating in a transient state; some operators or systems may, for example, vary the engine speed following cold start. If the Lambda sensor is not operational due to transient conditions or the sensor not being in an operational range, the method continues to block 310 in which SAI mass flow is calculated using a method as discussed above relative to Equations 1-2. Optionally, the calculated mass flow at block 310, or the pressures that are calculated for purposes of block 310, may be used to determine whether to activate the E-Turbo motor, as indicated at 312. The SAI valve position is then modulated as indicated at 314 by, for example, issuing a control signal to open the valve if SAI mass flow is less than desired, or to close the valve if SAI mass flow is greater than desired. Control in block 314 may be performed by the use of, for example, PID, MPC, or any other suitable control algorithm.

Next, the method determines whether the ECD temperature remains below a threshold for ECD operation, as indicated at 330. If ECD temperature remains below threshold, then the method returns to block 304 to again check on whether the Lambda sensor is operable. If the ECD temperature has reached its threshold, the method may proceed to closing the SAI valve at 332 and ending.

Returning to block 304, if the Lambda sensor is in an operational state (whether coming from block 302 or block 330), the method next obtains the Lambda sensor output at 320, and modulates SAI valve position at 322 to either increase the mass flow through the SAI (if the Lambda sensor indicates low to no oxygen in the exhaust), or to decrease the mass flow through the SAI (if the Lambda sensor indicates excess oxygen in the exhaust). Again, control may be PID, MPC, or any other suitable control. In an example, if the Lambda output indicates low or no oxygen in the exhaust and the SAI valve position or control signal is already at a maximum opening of the SAI valve, the E-Turbo may be activated.

In some examples, the SAI mass flow will still be calculated after the Lambda sensor is operational as indicated at 326. For example, SAI mass flow calculations may be used to determine whether the boost pressure is sufficient to achieve the desired effect (a desired quantity of SAI mass flow) in the aftertreatment system. Again, using the exhaust manifold pressure and compressor outlet pressures as a simple example, if the compressor outlet pressure is not high enough to ensure mass flow through the SAI valve to the exhaust manifold, the E-Turbo motor may be activated to add further torque to the compressor to thereby increase compressor outlet pressure.

It may be noted that FIG. 4 illustrates two different conditions for controlling the E-Turbo in association with the SAI function. In one, when the Lambda sensor identifies low oxygen content with the SAI valve fully open, it may be inferred that SAI mass flow is inadequate, and increased charge air pressure is desired. If the SAI valve is partially open and low oxygen content is sensed by the Lambda sensor, in some examples, the low oxygen content may prompt a change to the SAI valve control signal to fully, or more fully, open the SAI valve. In addition or alternatively, the E-Turbo is activated to provide additional charge pressure and hence additional SAI mass flow (and/or the settings of a wastegate and/or VGT may be modified to increase compressor power and/or turbocharger speed to increase charge pressure). In another, when SAI mass flow is estimated, using the analytical process of Equations 1 and 2, to be below a desired level, due to insufficient pressure differential between $p_{21}$ and $p_3$, the E-Turbo can be called upon to increase $p_{21}$. Further, if the pressure differential is deemed insufficient, settings of a wastegate and/or VGT may be modified to increase compressor power and/or turbocharger speed to increase charge pressure).

In some examples, blockage or failure of the SAI valve may be identified. In one example, with the Lambda sensor operational (preferably operating in its acceptable temperature range and absent transient conditions), the SAI valve control signal may be changed to open the valve. It would then be expected that the Lambda sensor would identify an increase in oxygen in the exhaust flow. If no change in oxygen content is identified, the system may confirm that the pressure differential between $p_{21}$ and $p_3$ exceeds at least a minimum threshold (and if not, may increase boost pressure using any of the above noted methods via wastegate, VGT, and/or E-Turbo operation), and then conclude that the SAI valve and/or SAI flow path is blocked or not functioning correctly.

In a further example, an SAI effect model may be constructed using a test stand, for example, to estimate changes in Lambda sensor output responsive to select levels of SAI mass flow under select engine conditions. Then, during operation, the SAI valve may be opened and the above methods (such as using Equations 1 and 2) are used to estimate SAI mass flow for inputting to the SAI effect model. Lambda sensor output is then monitored to confirm a match to modeled effects; if no match is found, the system may record a possible issue with the SAI valve and/or SAI flow path.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "a" or "an" are used, as is common, to include one or more than one, independent of any other instances or usages of "at least one" or "one or more." Moreover, in the claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

Also, in the above Detailed Description, various features may be grouped together to streamline the disclosure. This should not be interpreted as intending that an unclaimed disclosed feature is essential to any claim. Rather, innovative subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the protection should be determined with reference to the appended claims, along with the full scope of equivalents to which such claims are entitled.

What is claimed is:

1. A method of operation in an engine system, the engine system including a combustion engine with an intake manifold and an exhaust manifold, a compressor configured to compress intake air upstream of the intake manifold, and an environmental catalyst device (ECD) downstream of the exhaust manifold configured to reduce one or more pollutants in exhaust air exiting the combustion engine, and a secondary air passage having a secondary air injection (SAI) valve, the secondary air passage and SAI valve controllably allowing compressed air from a first location downstream of the compressor and upstream of the intake manifold to be passed to a second location downstream of the exhaust manifold and upstream of the ECD, the SAI valve being controlled with an SAI control signal, the method comprising:
- calculating a first pressure and a first temperature at the first location using one or more flow models and at least a sensed intake manifold pressure and a sensed intake manifold temperature;
- calculating an exhaust manifold pressure; and
- calculating a mass flow through the SAI valve from a model of the SAI valve using the first pressure, the first temperature, the exhaust manifold pressure, and the SAI control signal as inputs to the model of the SAI valve.

2. The method of claim 1, further comprising adjusting the SAI control signal in response to the calculated mass flow through the SAI valve.

3. The method of claim 1 further comprising:
- determining that the engine has been started in a cold start condition;
- issuing a control signal to open the SAI valve;
- modulating a position of the SAI valve responsive to the calculated mass flow through the SAI valve;
- determining that an ECD temperature is above an ECD temperature threshold; and
- issuing a control signal to close the SAI valve.

4. The method of claim 3 wherein the compressor is coupled to an electric motor configured to selectively provide torque to the compressor, and the method also includes activating the electric motor to provide torque to the compressor to raise pressure at the first location while the SAI valve is open.

5. The method of claim 3 wherein the compressor is coupled to an electric motor configured to selectively provide torque to the compressor, and the method also includes:
- estimating a pressure differential between the first location and the second location;
- comparing the pressure differential to a threshold;
- determining that the pressure differential is less than the threshold; and
- in response, activating the electric motor to provide torque to the compressor to raise pressure at the first location.

6. The method of claim 1 wherein the engine system further includes a charge air cooler (CAC) positioned downstream of the compressor and upstream of the intake manifold, and the first location is upstream of the CAC.

7. The method of claim 1 wherein the compressor is part of a turbocharger including a turbine located downstream of the exhaust manifold and upstream of the ECD, and the second location is downstream of the turbine and upstream of the ECD.

8. The method of claim 7, wherein the steps of calculating the exhaust manifold pressure and calculating the mass flow through the SAI valve are performed using an iterative calculation to solve these mass flow equations:
- mass flow into the intake manifold plus mass of a quantity of fuel provided to the combustion engine plus mass flow through the SAI valve equals turbine mass flow; and
- turbine mass flow equals mass flow through the ECD.

9. The method of claim 8 wherein the engine system further comprises a wastegate positioned to allow exhaust to bypass the turbine, and the turbine mass flow includes mass flow passing through the turbine and mass flow bypassing the turbine via the wastegate.

10. The method of claim 8 wherein the turbine is a variable geometry turbine (VGT).

11. The method of claim 1, wherein the engine system further includes a particulate filter (PF), and the method further comprises:
- determining that the PF requires refreshing;
- issuing a control signal to open the SAI valve to allow secondary air flow for use in refreshing the PF;
- modulating a position of the SAI valve responsive to the calculated mass flow through the SAI valve;
- determining that the PF has been refreshed; and
- issuing a control signal to close the SAI valve.

12. A vehicle comprising:
- a combustion engine with an intake manifold and an exhaust manifold;
- a compressor configured to compress intake air upstream of the intake manifold;
- an environmental catalyst device (ECD) downstream of the exhaust manifold configured to reduce one or more pollutants in exhaust air exiting the combustion engine;
- a secondary air passage having a secondary air injection (SAI) valve, the secondary air passage and SAI valve controllably allowing compressed air from a first location downstream of the compressor and upstream of the intake manifold to be passed to a second location downstream of the exhaust manifold and upstream of the ECD, the SAI valve being controlled with an SAI control signal; and
- a controller configured to perform a method comprising:
  - calculating a first pressure and a first temperature at the first location using one or more flow models and at least a sensed intake manifold pressure and a sensed intake manifold temperature;
  - calculating an exhaust manifold pressure; and
  - calculating a mass flow through the SAI valve from a model of the SAI valve using the first pressure, the first temperature, the exhaust manifold pressure, and the SAI control signal as inputs to the model of the SAI valve.

13. The vehicle of claim 12, wherein the controller is further configured to issue an SAI control signal in response to the calculated mass flow through the SAI valve to thereby modulate the mass flow through the SAI valve.

14. The vehicle of claim 12, wherein the controller is further configured to:
- determine that the engine has been started in a cold start condition;
- issue a control signal to open the SAI valve;
- modulate a position of the SAI valve responsive to the calculated mass flow through the SAI valve;
- determine that an ECD temperature is above an ECD temperature threshold; and
- issue a control signal to close the SAI valve.

15. The vehicle of claim 12, further comprising an electric motor coupled to the compressor to selectively provide torque to the compressor; wherein the controller is further configured to activate the electric motor to provide torque to the compressor to raise pressure at the first location while the SAI valve is open.

16. The vehicle of claim 12, further comprising an electric motor configured to selectively provide torque to the compressor; wherein the controller is further configured to determine whether a pressure differential between the first location and the second location is greater than a pressure differential threshold and, if not, activate the electric motor to provide torque to the compressor to raise pressure at the first location.

17. The vehicle of claim 12, further comprising a charge air cooler (CAC) positioned downstream of the compressor and upstream of the intake manifold, wherein the first location is upstream of the CAC.

18. The vehicle of claim 12, further comprising a turbine located downstream of the exhaust manifold and upstream of the ECD, and the second location is downstream of the turbine and upstream of the ECD; wherein the turbine and compressor are part of a turbocharger further including a drive shaft coupling the turbine to the compressor.

19. The vehicle of claim 18, wherein the controller is configured to calculate the exhaust manifold pressure and calculate the mass flow through the SAI valve using an iterative calculation to solve these mass flow equations:
- mass flow into the intake manifold plus mass of a quantity of fuel provided to the combustion engine plus mass flow through the SAI valve equals turbine mass flow; and
- turbine mass flow equals mass flow through the ECD.

20. The vehicle of claim 12, further comprising a particulate filter (PF);
- wherein the controller is further configured to:
- determine that the PF requires refreshing;
- issue a control signal to open the SAI valve to allow secondary air flow for use in refreshing the PF;
- modulate position of the SAI valve responsive to the calculated mass flow through the SAI valve;
- determine that the PF has been refreshed; and
- issue a control signal to close the SAI valve.

* * * * *